United States Patent
Klipper et al.

(10) Patent No.: US 9,968,926 B2
(45) Date of Patent: May 15, 2018

(54) METHOD FOR PRODUCING AMINO METHYLATED BEAD POLYMERIZATES

(71) Applicant: LANXESS Deutschland GmbH, Cologne (DE)

(72) Inventors: Reinhold Klipper, Cologne (DE); Pierre Vanhoorne, Monheim (DE); Areski Rezkallah, Bergisch Gladbach (DE); Bernd Koop, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days. days.

(21) Appl. No.: 15/536,699

(22) PCT Filed: Dec. 21, 2015

(86) PCT No.: PCT/EP2015/080833
§ 371 (c)(1),
(2) Date: Jun. 16, 2017

(87) PCT Pub. No.: WO2016/102491
PCT Pub. Date: Jun. 30, 2016

(65) Prior Publication Data
US 2017/0348685 A1    Dec. 7, 2017

(30) Foreign Application Priority Data

Dec. 22, 2014 (EP) .................... 14199644

(51) Int. Cl.
| | | |
|---|---|---|
| B01J 41/14 | (2006.01) |
| B01J 45/00 | (2006.01) |
| C08F 8/12 | (2006.01) |
| C08F 8/30 | (2006.01) |
| C08F 212/08 | (2006.01) |
| C08F 212/36 | (2006.01) |
| B01J 41/13 | (2017.01) |
| C08F 212/34 | (2006.01) |

(52) U.S. Cl.
CPC ............... B01J 41/13 (2017.01); B01J 45/00 (2013.01); C08F 8/12 (2013.01); C08F 8/30 (2013.01); C08F 212/08 (2013.01); C08F 212/36 (2013.01)

(58) Field of Classification Search
CPC .. C08F 8/12; C08F 8/30; C08F 212/34; C08F 212/36; B01J 41/13
USPC .......................................... 525/333.6; 521/32
See application file for complete search history.

(56) References Cited

U.S. PATENT DOCUMENTS

| | | |
|---|---|---|
| 3,989,650 A | 11/1976 | Lange et al. |
| 4,232,125 A | 11/1980 | Buske |
| 4,382,124 A | 5/1983 | Meitzner et al. |
| 4,419,245 A | 12/1983 | Barrett et al. |
| 4,427,794 A | 1/1984 | Lange et al. |
| 4,444,961 A | 4/1984 | Timm |
| 4,952,608 A * | 8/1990 | Klipper ............... C08F 8/30 521/32 |
| 5,231,115 A | 7/1993 | Harris |
| 7,053,129 B1 * | 5/2006 | Klipper ............... B01J 39/04 521/32 |
| 9,834,653 B2 | 12/2017 | Klipper et al. |

OTHER PUBLICATIONS

European Search Report from European Application No. 14199644 dated May 27, 2015, two pages.

* cited by examiner

*Primary Examiner* — Fred M Teskin

(57) ABSTRACT

The invention relates to a process for preparing aminomethylated bead polymers using condensed formaldehydes and carboxylic anhydrides.

15 Claims, No Drawings

METHOD FOR PRODUCING AMINO METHYLATED BEAD POLYMERIZATES

The invention relates to a process for preparing aminomethylated bead polymers using condensed formaldehydes and carboxylic anhydrides.

A process for preparing aminomethylated bead polymers is known from U.S. Pat. No. 4,232,125 and PCT/EP2014/067109, in which phthalimide and paraformaldehyde and the bead polymer are converted, likewise in the presence of 1,2-dichloroethane as swelling agent, together with sulphuric acid as Friedel-Crafts catalyst, in a one-pot reaction in which the carbonium ion of methylphthalimide is formed as intermediate, to the phthalimidomethylated bead polymer. The phthalimidomethylated bead polymer is then hydrolysed under alkaline conditions to give the aminomethylated bead polymer.

U.S. Pat. No. 3,989,650 discloses a process for preparing aminomethylated bead polymers, in which N-hydroxyalkylimides or N-hydroxyalkylamides are reacted with aliphatic carboxylic acids and carboxylic anhydrides to give their esters and then the bead polymer is amidomethylated in the presence of a swelling agent and a Friedel-Crafts catalyst. N-Hydroxyalkylimides are typically prepared by reacting phthalimide, for example, with formaldehyde and then isolating it. The amidomethylated bead polymer is then hydrolysed under alkaline conditions to give the amidomethylated bead polymer.

A disadvantage of the aforementioned processes is that the processes cannot be performed efficiently enough in industrial and economic terms.

There was therefore a need for a process for preparing aminomethylated bead polymers, with which the disadvantages of the prior art can be overcome.

It has been found that, surprisingly, aminomethylated bead polymers can be prepared in high yields in the presence of aliphatic saturated or unsaturated carboxylic anhydrides or in the presence of mixtures of these carboxylic anhydrides and an aliphatic saturated or unsaturated carboxylic acid. At the same time, it is possible to very substantially dispense with the use of chlorinated organic solvents. The invention therefore provides a process for preparing aminomethylated bead polymers, characterized in that
a) monomer droplets composed of a mixture comprising at least one monovinylaromatic compound, at least one polyvinylaromatic compound and at least one initiator are converted to a bead polymer and
b) the bead polymer from step a) is reacted with compounds of the formula (I) or salts thereof

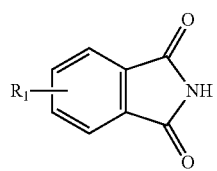

where $R_1=C_1$-$C_3$-alkyl or H and compounds of the formula (II)

where n=2 to 100,
in the presence of aliphatic saturated or unsaturated carboxylic anhydrides or in the presence of mixtures of aliphatic saturated or unsaturated carboxylic anhydrides and at least one aliphatic saturated or unsaturated carboxylic acid, and
in the presence of at least one Friedel-Crafts catalyst,
to give a phthalimidomethylated bead polymer, and the amount of the compounds of the formula (I) and the compounds of the formula (II) used, the bead polymer, and the aliphatic saturated or unsaturated carboxylic anhydrides, Friedel-Crafts catalysts and any carboxylic acids together in the reaction mixture is greater than 80% by weight based on the total amount of the reaction mixture, and
c) the phthalimidomethylated bead polymer is hydrolysed to give an aminomethylated bead polymer.

$R_1$ is preferably H. If $R_1$=H, the compound of the formula (I) is phthalimide. Compounds of the formula (I) are preferably phthalimide and salts or acid addition compounds thereof. Acid addition compounds may be understood to mean, for example, the adducts with hydrochloric acid or sulphuric acid. Preferably, the salts of the compounds of the formula (I) are quaternary phthalimide adducts formed from phthalimide and sulphuric acid.

Preferably, n=2 to 30. More preferably, n=8 to 30.

The compounds of the formula (II) may be linear or else cyclic condensates of formaldehyde, including trioxane for example. Preference is given to using, as compounds of the formula (II), paraformaldehyde or trioxane or mixtures of these compounds. More preferably, the compounds of the formula (II) are paraformaldehyde.

Carboxylic anhydrides used in process step b) may, for example and with preference, be aliphatic saturated or unsaturated mono-, di- or tricarboxylic anhydrides that are liquid at temperatures between 10° C. and 60° C., for example succinic anhydride, oxalic anhydride, adipic anhydride, maleic anhydride, acetic anhydride, butyric anhydride, propionic anhydride, hexanoic anhydride or pentanoic anhydride and the isomers thereof, for example valeric anhydride, isovaleric anhydride, 2-methylbutyric anhydride or pivalic anhydride. Carboxylic anhydrides used in process step b) are more preferably aliphatic and saturated monocarboxylic anhydrides that are liquid at temperatures between 10° C. and 60° C. Very particular preference is given to using acetic anhydride or pentanoic anhydride and the valeric anhydride, isovaleric anhydride, 2-methylbutyric anhydride or pivalic anhydride isomers thereof. Even further preferably, acetic anhydride is used.

Carboxylic acids used in process step b) may, for example and with preference, be liquid saturated or unsaturated mono-, di- or tricarboxylic acids that are liquid at temperatures between 10° C. and 60° C., for example succinic acid, oxalic acid, adipic acid, formic acid, diglycolic acid, maleic acid, acetic acid, butyric acid, propanoic acid, hexanoic acid or heptanoic acid. Preferably, the carboxylic anhydrides and the corresponding carboxylic acids are used in mixtures, i.e., for example, valeric anhydride with valeric acid or acetic anhydride with acetic acid. More preferably, carboxylic acids used in process step b) are aliphatic and saturated monocarboxylic acids that are liquid at temperatures between 10° C. and 60° C. Most preferably, acetic anhydride is used with acetic acid as a mixture. If mixtures of carboxylic anhydride and carboxylic acid are used, the ratio of carboxylic anhydride to carboxylic acid is generally between 100:1 and 1:100. Preferably, the ratio between carboxylic anhydride and carboxylic acid is between 100:1 and 1:1. More preferably, the ratio between carboxylic anhydride and carboxylic acid is between 10:1 and 1:10. Even further preferably, the ratio between carboxylic anhydride and carboxylic acid is between 10:1 and 3:1.

Friedel-Crafts catalysts used in process step b) may preferably be strong inorganic or organic protic acids or Lewis acids, for example zinc chloride, aluminium chloride, tin tetrachloride, iron(III) chloride or further iron(III) salts or mixtures of these compounds. Friedel-Crafts catalysts used are, for example and with preference, aliphatic or aromatic methane-, benzene- and toluenesulphonic acids, hydrochloric acid, sulphuric acid, oleum, nitric acid or phosphoric acid or mixtures of these acids. Organic protic acids used may, for example, be aliphatic or aromatic methane-, benzene- and toluenesulphonic acids or fluorosulphonic acid. Friedel-Crafts catalysts used are preferably sulphuric acid, oleum and iron(III) salts or mixtures of these compounds. Friedel-Crafts catalysts used are more preferably sulphuric acid and iron(III) chloride and mixtures of these compounds.

Preferably, the iron(III) salts are used relative to the sulphuric acid in a molar ratio of 10:1 to 1:10, more preferably of 1:15 to 1:4. Most preferably, the iron(III) chloride is used relative to the sulphuric acid in a molar ratio of 1:9 to 1:5.

The scope of the invention encompasses all radical definitions, parameters and elucidations above and detailed hereinafter, in general terms or mentioned within areas of preference, together with one another, i.e. Including any combination between the respective areas and areas of preference.

In process step a), at least one monovinylaromatic compound and at least one polyvinylaromatic compound are used. However, it is also possible to use mixtures of two or more monovinylaromatic compounds and mixtures of two or more polyvinylaromatic compounds.

In the context of the present invention, monovinylaromatic compounds used in process step a) are preferably styrene, vinyltoluene, ethylstyrene, α-methylstyrene, chlorostyrene, or chloromethylstyrene.

It is especially preferable to use styrene or mixtures of styrene with the abovementioned monomers, preferably with ethylstyrene.

Preferred polyvinylaromatic compounds in the context of the present invention for process step a) are divinylbenzene, divinyltoluene, trivinylbenzene, divinylnaphthalene, trivinylnaphthalene, especially preferably divinylbenzene.

The polyvinylaromatic compounds are preferably used in amounts of 1%-20% by weight, more preferably 2%-12% by weight, especially preferably 4%-10% by weight, based on the monomer or mixture thereof with other monomers. The nature of the polyvinylaromatic compounds (crosslinkers) is selected with regard to the later use of the bead polymer. In the case of use of divinylbenzene, commercial qualities of divinylbenzene also comprising ethylvinylbenzene as well as the isomers of divinylbenzene are adequate.

The term "bead polymer" for the purposes of the invention is a crosslinked polymer in bead form.

The terms "microporous" or "in gel form" and "macroporous" have already been described in detail in the specialist literature.

Macroporous bead polymers are preferably formed by addition of inert materials, preferably at least one porogen, to the monomer mixture in the course of polymerization, in order to produce a macroporous structure in the bead polymer. Especially preferred porogens are hexane, octane, isooctane, isododecane, methyl ethyl ketone, butanol or octanol, and isomers thereof. Particularly suitable substances are organic substances which dissolve in the monomer but dissolve or swell the bead polymer sparingly (precipitant for polymers), for example aliphatic hydrocarbons (Farbenfabriken Bayer DBP 1045102, 1957; DBP 1113570, 1957).

U.S. Pat. No. 4,382,124 uses, as porogen, the alcohols having 4 to 10 carbon atoms which are likewise to be used with preference in the context of the present invention for preparation of monodisperse, macroporous bead polymers based on styrene/divinylbenzene. In addition, an overview of the preparation methods for macroporous bead polymers is given.

Preferably, in process step a), at least one porogen is added. Preferably, the aminomethylated bead polymers have a macroporous structure.

The bead polymers prepared in process step a) can be prepared in heterodisperse or monodisperse form.

The preparation of heterodisperse bead polymers is accomplished by general processes known to those skilled in the art, for example with the aid of suspension polymerization.

Preference is given to preparing monodisperse bead polymers in process step a).

In the present application, monodisperse materials are those in which at least 90% by volume or % by mass of the particles have a diameter within the range of ±10% of the most common diameter.

For example, in the case of a material having a most common diameter of 0.5 mm, at least 90% by volume or % by mass is within a size range between 0.45 mm and 0.55 mm; in the case of a material having a most common diameter of 0.7 mm, at least 90% by volume or % by mass is within a size range between 0.77 mm and 0.63 mm.

In a preferred embodiment of the present invention, in process step a), microencapsulated monomer droplets are used in the preparation of monodisperse bead polymers.

Useful materials for microencapsulation of the monomer droplets are those known for use as complex coacervates, especially polyesters, natural and synthetic polyamides, polyurethanes or polyureas.

Gelatin is a natural polyamide used with preference. Gelatin is especially employed in the form of coacervate and complex coacervate. For the purposes of the invention, gelatin-containing complex coacervates are, in particular, combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to using acrylic acid and acrylamide. Gelatin-containing capsules can be hardened with conventional hardeners, for example formaldehyde or glutaraldehyde. The encapsulation of monomer droplets with gelatin, gelatin-containing coacervates and gelatin-containing complex coacervates is described in detail in EP-A 0 046 535. The methods for encapsulation with synthetic polymers are known. Preference is given to phase interfacial condensation, in which a reactive component dissolved in the monomer droplet (especially an isocyanate or an acid chloride) is reacted with a second reactive component dissolved in the aqueous phase (especially an amine).

The heterodisperse or optionally microencapsulated monodisperse monomer droplets contain at least one initiator or mixtures of initiators (initiator combination) to trigger the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tertamylperoxy-2-ethylhexane, and also azo compounds such as 2,2'-azobis(isobutyronitrile) or 2,2'-azobis(2-methylisobutyronitrile).

The initiators are preferably used in amounts of 0.05% to 2.5% by weight, more preferably 0.1% to 1.5% by weight, based on the monomer mixture.

The optionally monodisperse microencapsulated monomer droplet may optionally also contain up to 30% by weight (based on the monomer) of crosslinked or uncrosslinked polymer. Preferred polymers derive from the aforementioned monomers, more preferably from styrene.

In the preparation of monodisperse bead polymers, in process step a), the aqueous phase, in a further preferred embodiment, may comprise a dissolved polymerization inhibitor. In this case, useful inhibitors are either inorganic or organic substances. Preferred inorganic inhibitors are nitrogen compounds, especially preferably hydroxylamine, hydrazine, sodium nitrite and potassium nitrite, salts of phosphorous acid such as sodium hydrogen phosphite, and sulphur compounds such as sodium dithionite, sodium thiosulphate, sodium sulphite, sodium bisulphite, sodium thiocyanate and ammonium thiocyanate. Examples of organic inhibitors are phenolic compounds such as hydroquinone, hydroquinone monomethyl ether, resorcinol, pyrocatechol, tert-butylpyrocatechol, pyrogallol and condensation products of phenols with aldehydes. Further preferred organic inhibitors are nitrogen compounds. Especially preferred are hydroxylamine derivatives, for example N,N-diethylhydroxylamine, N-isopropylhydroxylamine and sulphonated or carboxylated N-alkylhydroxylamine or N,N-dialkylhydroxylamine derivatives, hydrazine derivatives, for example N,N-hydrazinodiacetic acid, nitroso compounds, for example N-nitrosophenylhydroxylamine, N-nitrosophenylhydroxylamine ammonium salt or N-nitrosophenylhydroxylamine aluminium salt. The concentration of the inhibitor is generally 5-1000 ppm (based on the aqueous phase), preferably 10-500 ppm, more preferably 10-250 ppm.

The polymerization of the optionally microencapsulated monodisperse monomer droplets to give the monodisperse bead polymer is effected, as already mentioned above, optionally or preferably in the presence of one or more protective colloids in the aqueous phase. Suitable protective colloids are natural or synthetic water-soluble polymers, preferably gelatin, starch, polyvinyl alcohol, polyvinylpyrrolidone, polyacrylic acid, polymethacrylic acid or copolymers of (meth)acrylic acid and (meth)acrylic esters. Preference is further given to cellulose derivatives, especially cellulose esters and cellulose ethers, such as carboxymethyl cellulose, methyl hydroxyethyl cellulose, methyl hydroxypropyl cellulose and hydroxyethyl cellulose. Gelatin is especially preferred. The amount of the protective colloids used is generally 0.05% to 1% by weight, based on the aqueous phase, preferably 0.05% to 0.5% by weight.

The polymerization to give the monodisperse bead polymer can, in an alternative preferred embodiment, be conducted in the presence of a buffer system. Preference is given to buffer systems which set the pH of the aqueous phase on commencement of the polymerization to a value between 14 and 6, preferably between 12 and 8. Under these conditions, protective colloids having carboxylic acid groups are wholly or partly present as salts. This causes a favourable effect on the action of the protective colloids. Particularly suitable buffer systems contain phosphate or borate salts. The terms "phosphate" and "borate" In the context of the invention also encompass the condensation products of the ortho forms of corresponding acids and salts. The concentration of the phosphate or borate in the aqueous phase is generally 0.5-500 mmol/l, especially 2.5-100 mmol/l.

The stirrer speed in the polymerization to give the monodisperse bead polymer is less critical and, in contrast to conventional bead polymerization, has no effect on the particle size. Low stirrer speeds are employed, these being sufficient to keep the suspended monomer droplets in suspension and to promote the removal of the heat of polymerization. For this task, it is possible to use various stirrer types. Particularly suitable stirrers are gate stirrers having axial action.

The volume ratio of encapsulated monomer droplets to aqueous phase is 1:0.75 to 1:20, preferably 1:1 to 1:6.

The polymerization temperature to give the monodisperse bead polymer is guided by the decomposition temperature of the initiator used. It is generally between 50 to 180° C., preferably between 55 and 130° C. Polymerization takes 0.5 to about 20 hours. It has been found to be useful to employ a temperature programme in which the polymerization is commenced at low temperature, for example 60° C., and the reaction temperature is raised with increasing polymerization conversion. In this way, for example, the requirement for reliable running of the reaction and high polymerization conversion can be fulfilled very efficiently. After the polymerization, the monodisperse bead polymer is isolated by conventional methods, for example by filtering or decanting, and optionally washed.

The preparation of the monodisperse bead polymers with the aid of the jetting principle or the seed-feed principle is known from the prior art and described, for example, in U.S. Pat. No. 4,444,961, EP-A 0 046 535, U.S. Pat. No. 4,419,245 or WO 93/12167.

Preference is given to preparing the monodisperse bead polymers with the aid of the jetting principle or the seed-feed principle.

Preference is given to preparing, in process step a), a macroporous, monodisperse bead polymer.

Process step b) can be conducted in different ways. The bead polymer could, for example, first be initially charged and a mixture of the compounds of the formula (I) and the compounds of the formula (II), the carboxylic anhydrides, optionally mixed with the carboxylic acids and the Friedel-Crafts catalysts, could be added thereto. However, it would be equally possible first to initially charge the carboxylic anhydrides, optionally mixed with carboxylic acids, and then to add the bead polymer and then to add the compounds of the formula (I) and then the Friedel-Crafts catalysts. Other sequences of addition are also conceivable. Preferably, the carboxylic anhydrides are first initially charged, optionally in a mixture with corresponding carboxylic acids, then the bead polymer is added. Thereafter, the compounds of the formula (I) and the compounds of the formula (II) are preferably metered in. Thereafter, the mixture is preferably heated and then the Friedel-Crafts catalysts are preferably added. Preferably, the temperature of the mixture is increased further thereafter. The reaction mixture is worked up by processes known to those skilled in the art. Preferably, the phthalimidomethylated bead polymer is filtered off. The procedure is preferably effected in a one-pot method. No separate preparation of reaction products formed as intermediates is necessary in the process according to the invention.

The amount of Friedel-Crafts catalyst which is used in process step b) is generally 0.5 to 20 mol per mole of compounds of the formula (I), but may also be smaller or greater. Preference is given to using 0.5 mol to 5 mol of Friedel-Crafts catalyst per mole of compounds of the formula (I). Particular preference is given to using 1 to 5 mol of Friedel-Crafts catalyst per mole of compounds of the formula (I).

The amount of carboxylic anhydrides which is used in process step b) is generally 1 to 10 mol per mole of compounds of the formula (I), but may also be smaller or greater. Preference is given to using 1 to 7 mol of carboxylic anhydrides per mole of compounds of the formula (I). Particular preference is given to using 1.0 to 4 mol of carboxylic anhydrides per mole of compounds of the formula (I). Very particular preference is given to using 1.5 to 4 mol of carboxylic anhydrides per mole of compounds of the formula (I). The amount of carboxylic anhydrides which is used in process step b) is generally $10^{-5}$ mol to 0.06 mol per gram of bead polymer, but may also be smaller or greater. Preference is given to using from 0.001 to 0.05 mol of carboxylic anhydride per gram of bead polymer.

The compounds of the formula (I) are generally used in process step b) in an amount of 0.01 to 1.0 mol per gram of compounds of the formula (II). The amount may also be smaller or greater. Preferably, the compounds of the formula (I) are used in process step b) in an amount of 0.01 to 0.05 mol per gram of compounds of the formula (II).

Preferably, the content of swelling agents in process step b) is less than 10% by weight based on the total amount of reactants used; more preferably, the content of swelling agents is less than 5% by weight, based on the total amount of the reactants. Process step b) is most preferably conducted without addition of swelling agents. Standard swelling agents are organic solvents, for example dichloromethane, dichloroethane, especially 1,2-dichloroethane, tetrachloroethane, dichloropropane, pentachloropropane, dimethylformamide, sulpholanes, nitropropanes or nitrobenzene.

Preferably, the temperature at which process step b) is conducted is between 50° C. and 125° C.

Preferably, the compounds of the formula (I) and the compounds of the formula (II), the bead polymer, the aliphatic, saturated or unsaturated carboxylic anhydrides, the carboxylic acids and the Friedel-Crafts catalysts used in process step b) are present together in an amount greater than 90% by weight in the reaction mixture, based on the total amount of the reaction mixture.

Preferably, the compounds of the formula (I) and the compounds of the formula (II), the bead polymer, the aliphatic, saturated or unsaturated carboxylic anhydrides, the carboxylic acids and the Friedel-Crafts catalysts used in process step b) are present together in an amount greater than 95% by weight in the reaction mixture, based on the total amount of the reaction mixture.

In process step b), preferably carboxylic anhydrides are used. Accordingly, in process step b), it is also possible to use mixtures consisting of the compounds of the formula (I), the compounds of the formula (II), bead polymer, aliphatic, saturated or unsaturated carboxylic anhydrides and Friedel-Crafts catalysts, and to use them without additional addition of carboxylic acids. In this case, it is likewise true that the total amount of the compounds of the formula (I) and the compounds of formula (II), the bead polymer, the aliphatic, saturated or unsaturated carboxylic anhydrides and Friedel-Crafts catalysts used is preferably greater than 80% by weight, more preferably greater than 90% by weight and most preferably greater than 95% by weight in the reaction mixture, based on the total amount of the reaction mixture.

In process step c), in general, the conversion of the phthalimidomethylated bead polymer to the aminomethylated bead polymer is effected with aqueous or alcoholic solutions of an alkali metal hydroxide such as sodium hydroxide or potassium hydroxide. In addition, process step c) is generally conducted at temperatures between 100° C. and 250° C., but may alternatively be conducted at higher or lower temperatures. Preferably, process step c) is conducted at temperatures between 120° C. and 190° C. Preferably, the conversion of the phthalimidomethylated bead polymer to the aminomethylated bead polymer in process step c) is effected with alkali metal or alkaline earth metal hydroxides or mixtures of these compounds, more preferably with alkali metal hydroxides, such as sodium hydroxide in particular. Preferably, the conversion in process step c) proceeds in the presence of an aqueous or alcoholic solution of an alkali metal hydroxide. The concentration of the aqueous sodium hydroxide solution is in the range from 10 to 50 wt %, preferably 20 to 40 wt %. The resultant aminomethylated bead polymer is preferably washed with demineralized water to free it of alkaline, but may alternatively be treated with other aqueous solutions or non-demineralized water.

The aminomethylated bead polymer may be used as anion exchanger or be converted further to chelate resins.

The conversion of the aminomethylated bead polymers obtained in process step c) to chelate resins is effected by standard methods known to those skilled in the art.

For example, chelate resins containing iminodiacetic acid groups can be prepared by reacting the aminomethyl group-containing bead polymer from process step c) in aqueous suspension with chloroacetic acid or derivatives thereof. It is likewise possible to react the aminomethylated bead polymers obtained in process step c) in sulphuric acid suspension with formalin in combination with P—H-acidic compounds (via a modified Mannich reaction) to give chelate resins having phosphonic acid groups.

With the aid of the process according to the invention, it is possible to prepare aminomethylated bead polymers with high yields, based on the amount of aminomethyl groups introduced.

The aminomethylated bead polymers prepared in accordance with the invention can be used as weakly basic anion exchangers or be converted to chelate resins.

In addition, it is possible to dispense with the use of toxic chlorinated organic solvents in the process according to the invention.

Determination of Amount of Basic Aminomethyl Groups in the Aminomethylated Bead Polymer 100 ml of the aminomethylated bead polymer are agitated down in the tamp volumeter and subsequently washed with demineralized water into a glass column. 1000 ml of 2% by weight aqueous sodium hydroxide solution are passed through the column in the course of 1 hour and 40 minutes.

Demineralized water is then passed through until 100 ml of eluate with added phenolphthalein have a consumption of not more than 0.05 ml.

50 ml of the resin are admixed in a beaker with 50 ml of demineralized water and 100 ml of 1 N hydrochloric acid.

The suspension is stirred for 30 minutes and then filled into a glass column. The liquid is drained off. A further 100 ml of 1 N hydrochloric acid are passed through the resin for 20 minutes. 200 ml of methanol are then passed through. All of the eluates are collected and combined and titrated with 1 N sodium hydroxide solution using methyl orange.

The number of aminomethyl groups in 1 liter of aminomethylated bead polymer is calculated by the following formula:

(200 V)*20=mol of aminomethyl groups per liter of aminomethylated bead polymer.

EXAMPLES

Example 1

1.1 Preparation of the Heterodisperse Macroporous Bead Polymer Based on Styrene, Divinylbenzene and Ethylstyrene

A 10 l glass reactor is charged with 3000 g of demineralized water, and a solution of 10 g of gelatin, 16 g of disodium hydrogenphosphate dodecahydrate and 0.73 g of resorcinol in 320 g of deionized water is added and mixed in. The mixture is equilibrated to 25° C. Subsequently, while stirring, a mixture of 3200 g of microencapsulated monomer droplets having a narrow particle size distribution, composed of 3.1% by weight of divinylbenzene and 0.6% by weight of ethylstyrene (used in the form of a commercial isomer mixture of divinylbenzene and ethylstyrene with 80% divinylbenzene), 0.4% by weight of dibenzoyl peroxide, 58.6% by weight of styrene and 37.5% by weight of isododecane (technical isomer mixture having a high proportion of pentamethylheptane) is applied, the microcapsule consisting of a formaldehyde-hardened complex coacervate composed of gelatin and a copolymer of acrylamide and acrylic acid, and 3200 g of aqueous phase having a pH of 12 are added. The mixture is stirred and polymerized to completion by increasing the temperature in accordance with a temperature programme beginning at 25° C. and ending at 95° C. The mixture is cooled, washed over a 32 µm sieve and then dried at 80° C. under reduced pressure. This gives 1893 g of a bead polymer.

1.2 Preparation of a Phthalimidomethylated Bead Polymer with Sulphuric Acid as Friedel-Crafts Catalyst

717.2 grams of acetic anhydride are initially charged at room temperature. 225 g of bead polymer from Example 1.1 are metered into the initial charge. The mixture is stirred at room temperature for 30 minutes. Then 516.3 grams of phthalimide and 119.2 grams paraformaldehyde (from INEOS Granuform 91 (n=8 to 30)) are metered in. The mixture is stirred at room temperature for 30 minutes. The mixture is heated to 60° C. and then 778.5 grams of sulphuric acid are metered in within 2 hours. The suspension is then heated to 115° C. and stirred at this temperature for a further 10 hours. The mixture is cooled down to 80° C., and 1500 ml of demineralized water are metered in. The mixture is heated to 95° C. and stirred for a further 2 hours. The mixture is cooled down and applied to a sieve. The phthalimidomethylated bead polymer is washed with demineralized water.

Volume yield: 1225 ml
Dry weight: 0.436 gram per ml
Nitrogen content: 5.05% by weight based on the total amount of the phthalimidomethylated bead polymer

1.3 Preparation of a Bead Polymer Containing Aminomethyl Groups by Hydrolysis of the Phthalimidomethylated Bead Polymer from Experiment 1.2

757 grams of demineralized water and 502 grams of 50% aqueous sodium hydroxide solution are initially charged at room temperature. 1205 ml of phthalimidomethylated bead polymer from 1.2 are metered into the initial charge. The suspension is heated in an autoclave to 180° C. for 2 hours while stirring and stirred at this temperature for a further 8 hours. After cooling, the suspension is applied to a sieve. The aminomethylated bead polymer is washed with demineralized water.

Volume yield: 940 ml
Dry weight: 0.27 gram per ml
HCl number: 1.73 mol/liter of resin
Nitrogen content: 8.01% by weight based on the total amount of the aminomethylated bead polymer

1.4 Preparation of a Phthalimidomethylated Bead Polymer with Sulphuric Acid and Iron(III) Chloride as Friedel-Crafts Catalyst

478.1 grams of acetic anhydride are initially charged at room temperature. 150 g of monodisperse bead polymer from Example 1.1 are metered into the initial charge. The mixture is stirred at room temperature for 30 minutes. Then 344.2 grams of phthalimide and 79.5 grams paraformaldehyde (from INEOS Granuform 91 (n=8 to 30)) are metered in. The mixture is stirred at room temperature for 60 minutes. The mixture is heated to 60° C. and 121.5 grams of iron(II) chloride are metered in. Stirring is continued for 30 minutes. 519 g of sulphuric acid are then metered in within 2 hours. The suspension is then heated to 115° C. and stirred at this temperature for a further 10 hours. The mixture is cooled down to 80° C., and 1500 ml of demineralized water are metered in. The mixture is heated to 95° C. and stirred for a further 2 hours. The mixture is cooled down and applied to a sieve. The phthalimidomethylated bead polymer is washed with demineralized water.

Volume yield: 940 ml
Dry weight: 0.4453 gram per ml
Nitrogen content: 5.3% by weight based on the total amount of the phthalimidomethylated bead polymer

1.5 Preparation of a Bead Polymer Containing Aminomethyl Groups by Hydrolysis of the Phthalimidomethylated Bead Polymer from Experiment 1.4

545 grams of demineralized water and 433 grams of 50% by weight aqueous sodium hydroxide solution are initially charged at room temperature. 920 ml of phthalimidomethylated bead polymer from Ex. 1.4 are metered into the initial charge. The suspension is heated in an autoclave to 180° C. for 2 hours while stirring and stirred at this temperature for a further 8 hours. After cooling, the suspension is applied to a sieve. The aminomethylated bead polymer is washed with demineralized water.

Volume yield: 710 ml
HCl number 1.54 mol/liter of resin.

What is claimed is:

1. A process for preparing aminomethylated bead polymers, the process comprising:
   a) converting monomer droplets composed of a mixture comprising at least one monovinylaromatic compound, at least one polyvinylaromatic compound, and at least one initiator to a bead polymer;
   b) reacting the bead polymer from step a) with compounds of the formula (I) or salts thereof

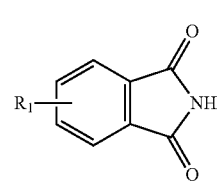

(I)

where $R_1$=$C_1$-$C_3$-alkyl or H, and
with compounds of the formula (II)

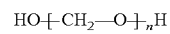

(II)

where n=2 to 100,
in the presence of aliphatic saturated or unsaturated carboxylic anhydrides or in the presence of mixtures of aliphatic saturated or unsaturated carboxylic anhydrides and at least one aliphatic saturated or unsaturated carboxylic acid, and in the presence of at least one Friedel-Crafts catalyst, to give a phthalimidomethylated bead polymer, and the amount of the compounds of the formula (I) and of the formula (II) used, the bead polymer, and the aliphatic saturated or unsaturated carboxylic anhydrides, Friedel-Crafts catalysts and any carboxylic adds together in the reaction mixture is greater than 80% by weight based on the total amount of the reaction mixture, and c) hydrolysing the phthalimidomethylated bead polymer to give an aminomethylated bead polymer.

2. The process according to claim 1, wherein the monovinylaromatic compounds are styrene, α-methylstyrene, vinyltoluene, ethylstyrene, t-butylstyrene, chlorostyrene, bromostyrene, chloromethylstyrene, or vinylnaphthalene, or mixtures of these compounds.

3. The process according to claim 1, wherein the polyvinylaromatic compounds are divinylbenzene, divinyltoluene, or trivinylbenzene, or mixtures of these compounds.

4. The process according to claim 1, wherein the monovinylaromatic compound is styrene and the polyvinylaromatic compound is divinylbenzene.

5. The process according to claim 1, wherein $R_1$=H.

6. The process according to claim 1, wherein n=8 to 30.

7. The process according to claim 1, wherein the Friedel-Crafts catalysts are a mixture of iron(III) chloride and sulphuric acid.

8. The process according to claim 1, wherein the carboxylic anhydrides and carboxylic acids are a mixture of acetic anhydride and acetic acid.

9. The process according to claim 8, wherein a ratio of acetic anhydride to acetic acid is between 3:1 and 10:1.

10. The process according to claim 1, further comprising using the Friedel-Crafts catalyst in an amount of 1 to 5 mol per mole of compounds of the formula (I).

11. The process according to claim 1, further comprising using the compounds of the formula (I) in an amount of 0.001 to 0.05 mol per gram of bead polymer.

12. The process according to claim 1, further comprising using the carboxylic anhydrides in an amount of 1.5 to 4 mol per mole of compounds of the formula (I).

13. The process according to claim 1, further comprising using the compounds of the formula (I) in an amount of 0.01 to 0.05 mol per gram of compounds of the formula (II).

14. The process according to claim 1, further comprising using a porogen in step a).

15. The process according to claim 1, wherein the amounts of the compounds of the formula (I), the compounds of the formula (II), the bead polymer, the aliphatic saturated or unsaturated carboxylic anhydrides, Friedel-Crafts catalysts, and any carboxylic acids used, together are an amount greater than 95% by weight in the reaction mixture, based on the total amount of the reaction mixture.

* * * * *